(12) United States Patent
Flynn et al.

(10) Patent No.: US 7,001,113 B2
(45) Date of Patent: Feb. 21, 2006

(54) VARIABLE HELIX CUTTING TOOLS

(76) Inventors: Clifford M. Flynn, 101 Broadway, Pittsfield, MA (US) 01201; Paul St. Louis, 35 Willow St., Apt. 109, Springfield, MA (US) 01103

(*) Notice: Subject to any disclaimer, the term of this patent is extended or adjusted under 35 U.S.C. 154(b) by 22 days.

(21) Appl. No.: 10/238,457

(22) Filed: Sep. 10, 2002

(65) Prior Publication Data

US 2003/0118411 A1    Jun. 26, 2003

Related U.S. Application Data

(60) Provisional application No. 60/318,351, filed on Sep. 10, 2001.

(51) Int. Cl.
    *B23B 51/00* (2006.01)
(52) U.S. Cl. .............. 407/54; 407/56; 407/63
(58) Field of Classification Search .......... 407/54, 407/56, 63, 118; 408/230
    See application file for complete search history.

(56) References Cited

U.S. PATENT DOCUMENTS

| | | | | |
|---|---|---|---|---|
| 5,035,617 A | * | 7/1991 | McSpadden | 433/102 |
| 5,478,176 A | * | 12/1995 | Stedt et al. | 408/59 |
| 6,345,941 B1 | * | 2/2002 | Fang et al. | 409/74 |
| 6,439,811 B1 | * | 8/2002 | Wardell | 407/54 |

* cited by examiner

*Primary Examiner*—Willmon Fridie, Jr.
(74) *Attorney, Agent, or Firm*—Gifford,Krass,Groh,Sprinkle,Anderson & Citkowski, PC

(57) ABSTRACT

Tools, including end mills, include a flute having a helix which varies along the length of the tool. The invention is not limited in terms of the number of flutes, whether odd or even; helix change(s) within a flute or between flutes; or indexing between cutting edges or flutes. Nor is the invention limited in terms of materials used, and may employ carbide or high-speed steel grades of materials, ceramics, or any other material that will be used in the future for material removal in a rotary tool. According to the invention, a 'slow' or 'high' helix may be used at the end or starting point of the tool, depending upon the application. A slow helix at the end or starting point is desirable for a strong corner in ramping and plunging into the material. When a higher helix is used at the end transitioning to a smaller helix at the shank, the corner is also protected because of the helix change. The high helix at the tip may be needed for shearing action in a given material.

2 Claims, 15 Drawing Sheets

.500 DIA X 1.250 FLUTE LENGTH

.500 DIA X 1.250 FLUTE LENGTH

.500 DIA X .625 FLUTE LENGTH

VARIABLE HELIX CUTTING TOOLS

REFERENCE TO RELATED APPLICATION

This application claims priority from U.S. Provisional Patent Application Ser. No. 60/318,351, filed Sep. 10, 2001, the entire content of which is incorporated herein by reference.

BACKGROUND OF THE INVENTION

Rotary cutting tools such as end mills are used for various machining processes on workpieces. Such machining processes, generically referred to as milling operations, include the forming of slots, keyways, pockets, and the like. Several criteria must be considered with respect to the design of such tools, including the time for completing a machining operation, the amount of material removed in a cut, the quality of the cut, and the wear on the tool itself during the milling operation.

To manufacture an end-mill tool, a grinder is typically used to grind a flute face and a corresponding cutting edge on the body of the tool. The grind (grinding operation) typically starts from a position adjacent an end of the body portion, continuing to a point at or near the interface of the body portion and the shank portion, commonly referred to as an "inception location." The grind forms a desired helical flute face and/or helical cutting edge. Prior-art end-mills typically have continuous helical flutes with continuous cutting edges helically extending from the inception location to the point (or vice-versa). The flutes function primarily for chip removal, in a manner similar to the helical flutes found on an ordinary drill bit.

It is known in the art to form flutes at a low helix angle or a high helix angle. A "low helix" (or low helical flute) is a flute that helically "winds" around a cylinder at an angle of no more than 45 degrees. A "super" low-helical flute would be a flute that winds around a cylinder at an angle of at no more than 15.degree. A "high helix" (or high helical flute) is a flute that helically winds around a cylinder at an angle of greater than 45 degrees, while a "super" high-helical flute winds around a cylinder at an angle of at least 65 degrees. Low helix angle flutes are typically employed for rough cutting while high helix angle flutes are employed for finish cutting.

Numerous variations of the grind (e.g., flute angle) have been attempted in end-mill tool design. Prior advancements relating to material removal and feed rate of end-mill cutters have been accomplished by (1) varying the spiral lead angle; (2) increasing the depth of the flutes in the body portion of the end-mill, (3) changing the radial rake; (4) changing the clearance angles of the cutting edges; and (5) forming chip splitting grooves in the flutes.

While such variations have proven successful in various applications, they are also the source of certain disadvantages and limitations. For example, such variations may weaken portions of the tool and may not be suitable for a particular applications (e.g., regarding milling time, rough cut, finish cut, etc.). Furthermore, existing end-mills are not efficient for both rough cutting and finish cutting. It is often advantageous when performing an end-mill machining operation to create many small chips, rather than fewer elongated curlicue chips. This allows, for example, rapid rate of removal of material from a workpiece without undue heating of the end-mill tool.

SUMMARY OF THE INVENTION

In contrast to the prior art, tools according to this invention include a flute having a helix which varies along the length of the tool. The invention is not limited in terms of the number of flutes, whether odd or even; helix change(s) within a flute or between flutes; or indexing between cutting edges or flutes.

Although well suited to end mills, the invention is also applicable to other types of cutting tools, including router bits, taps, thread mills, and insertable helical tooling. Nor is the invention limited in terms of materials used, and may employ carbide or high-speed steel grades of materials, ceramics, or any other material that will be used in the future for material removal in a rotary tool.

According to the invention, a 'slow' or 'high' helix may be used at the end or starting point of the tool, depending upon the application. A slow helix at the end or starting point is desirable for a strong corner in ramping and plunging into the material. When a higher helix is used at the end transitioning to a smaller helix at the shank, the corner is also protected because of the helix change. The high helix at the tip may be needed for shearing action in a given material.

The various alternative embodiments offer many significant advantages. Changing the helix generally removes the chip from the cutting field faster as chip flows up the changing helical flute. The changing helix also tends to break the chip into smaller chip length because the formation of the chip accrued at a helix that is different from the helix in the upper flute zone helix angle, which is out of the cutting zone. This change in shape or path is different than the formation shape of the chip, thus breaking the chip original shape.

The use of a variable helix also the contact angle of the cutting edge. This, in turn, retards chatter from developing because there is not a repeating contact of a straight line from flute to flute. In the continuing helix change of contact, the line of contact is always changing. The retarding of chatter improves cutting action and tool life, surface finish on the material, resulting in less manufacturing stress on the machines.

The invention further makes possible a faster feed rate or larger chip load per tooth because of chatter reduction in the cutting action. A deeper depth of cut is often possible due to chatter reduction in the cutting action. With high-helix tooling (i.e., 45 to 60 degrees), a corkscrew effect is a general handicap, pulling the cutter into the work piece or the cutter pulling the material upward. As such, high helix tools generally require corner protection for performance. With the variable helix made possible by this invention, corner protection is not needed, and the corkscrew effect is reduced or eliminated.

DETAILED DESCRIPTION OF THE INVENTION

As discussed in the Background, this invention resides in tools, including but not limited to end mills, including a variable helix within a single flute, as well as variable helix(s) in multi-flutes. The various embodiments reduce or eliminate chatter, in aggressive cutting as well as in finish machining processes. This enables a deeper depth of cut or metal removal rate and, in many cases, an increase in tool life.

The design(s) are not limited to even number of flutes, or the total number in general in that the geometries may range a 1-flute tool to a multi-flute tool of 10 flutes or more. Additionally, the variable helix angle(s) according to the invention may change from flute to flute or may remain the same from flute to flute. The particular combination(s) is based on application and/or manufacturing procedure for a given product's needed results.

Generally speaking, the design is not limited to each flute not being the same variable helix or combination of a standard helix. A design could have all flutes that are the same from each other, with the same variable helix. The change in the variability of the helix from the end of the tool to the shank of the tool will cause the shear action not to be on a straight line with a continuing changing contact point of shear, thus reducing the chatter from forming.

The variable helix from flute to flute design will reduce the repeating effect that causes chatter in a design of a standard end mill. This cutting acting based on what is referred to as a standard uniform end mill. A straight helix from tip or end of tool to the shank is refereed to as a standard helix.

The indexing of the flutes may also vary. That is, the timing from flute to flute with the variable helix may also be part of the chatter reduction process. For the purposes of this disclosure, flute-to-flute timing or indexing involves the rotation of the end mill fluting positions: a four flute $1^{st}$ flute at 0 degrees, then the $2^{nd}$ at 80 degrees (normal would be 90 degrees), $3^{rd}$ could be at 180 degrees, with the $4^{th}$ at 260 degrees (normal at 270 degrees). All flutes may be unequally indexed, insofar as the design is not subject to a pattern of index between flutes.

Indeed, the timing may change from diameter and material to be machined, not limited to even or odd number of flutes or a given timing difference between flutes. Timing change from flute to flute may be needed to fit the helix(s) of the end mill on a cylinder for a specific design.

Reference is now made to the drawings, wherein FIGS. 1 through 7 illustrate detailed embodiments according to the invention, and FIGS. 8 through 23 present different examples and wire-frame representations.

Figure 1:
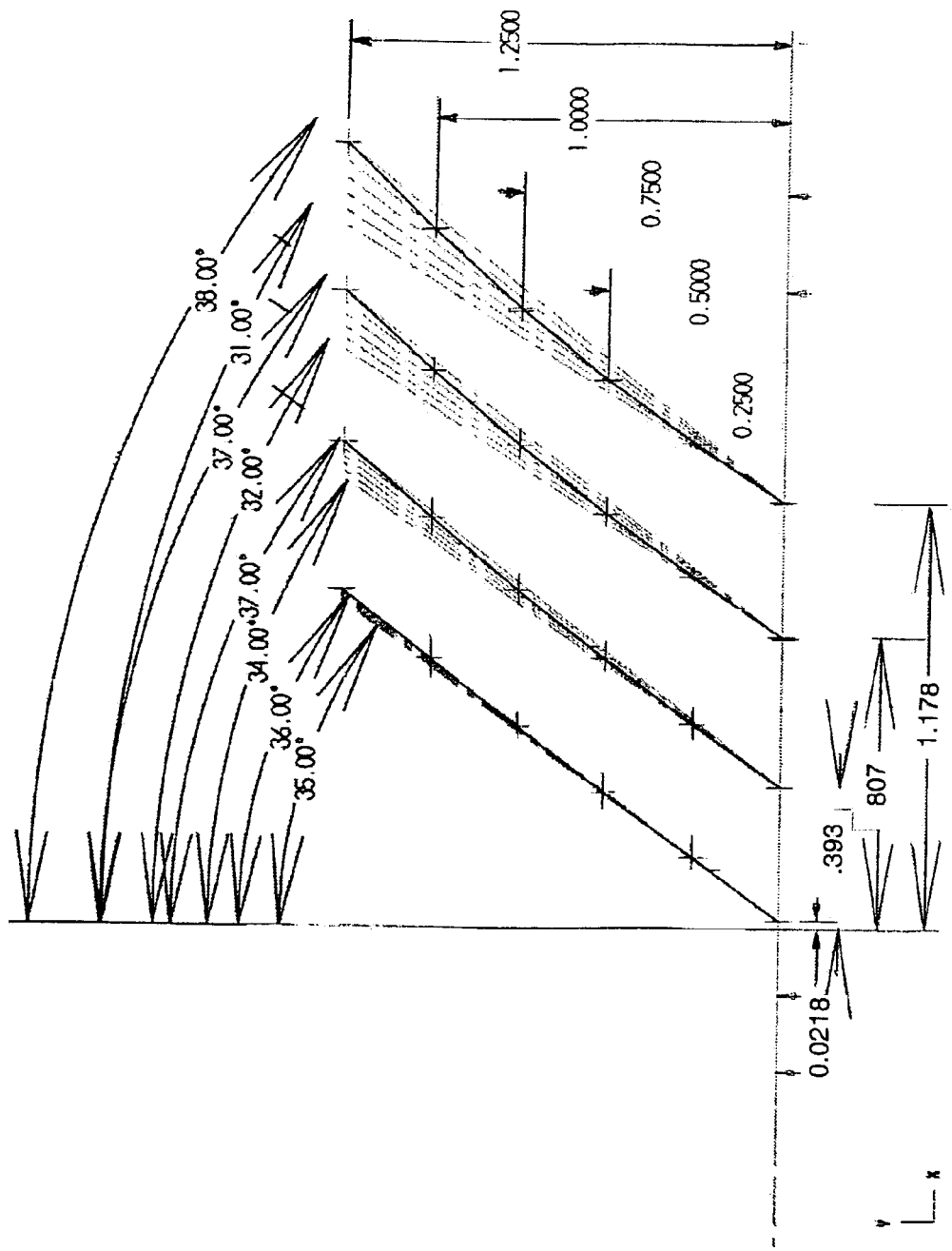
FIG. 1 is diagram that illustrates a four-flute end mill according to the invention with all four flutes having a different helix from start to finish within a flute and each flute is different from one another. The index or spacing from flute to flute is also different.
Figure 2:
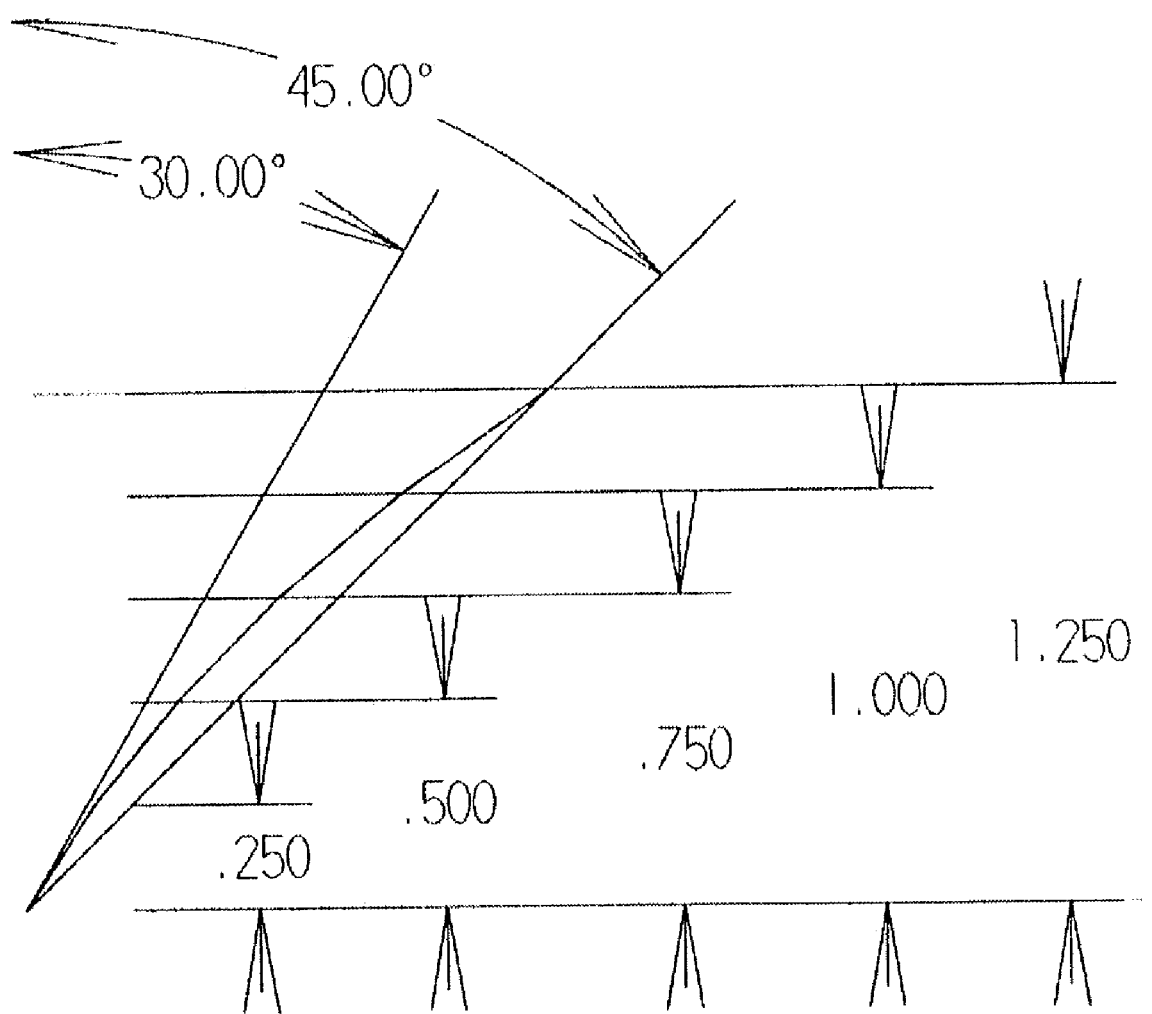
FIG. 2 is a drawing of a single flute used to illustrate a change of 30 degrees to an ending helix of 45 degrees.
Figure 3:
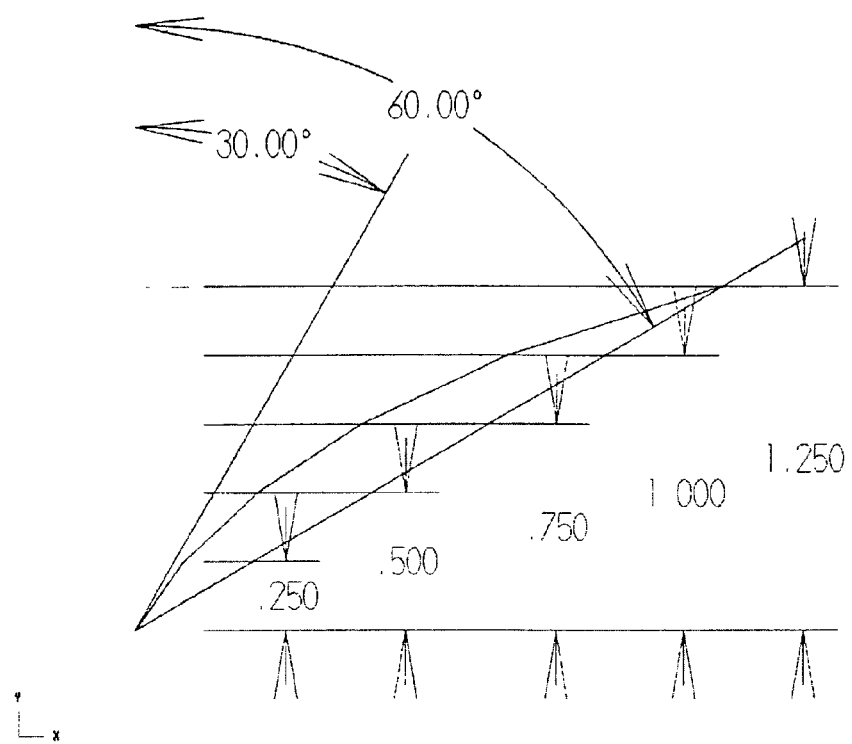
FIG. 3 is a drawing of a single flute used to illustrate a change of 30 degrees to an ending helix of 60 degrees.

FIG. 1 is a drawing representative of end mill with four flutes, each having a different helix from start to finish. The index or spacing from flute to flute is also different. In this particular example, flute 1 varies by one degree, from 35 degrees to 36 degrees, and is indexed 0.0218 from center. Flute 2 is indexed at 0.393, and varies from 34 degrees to 37 degrees, and so on. FIG. 2 is a drawing which shows how a single flute may vary by a greater amount, in this case a beginning angle of 30 degrees, to an ending helix of 45 degrees. FIG. 3 shows a single flute changing from 30 degrees to an ending helix of 60 degrees.

Figure 4:
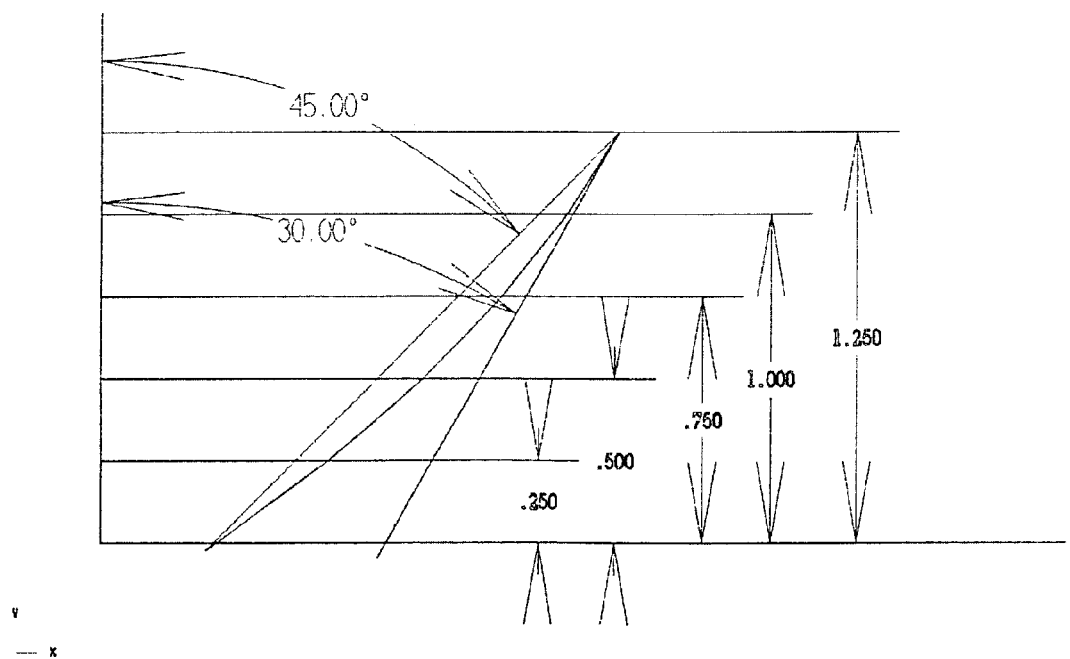
FIG. 4 is a drawing of a single flute used to illustrate a change of 45 degrees to an ending helix of 30 degrees. This is to illustrate that the change in helix IS NOT SUBJECT TO ALWAYS SMALLER HELIX ANGLE TO LARGER HELIX ANGLE.
Figure 5:
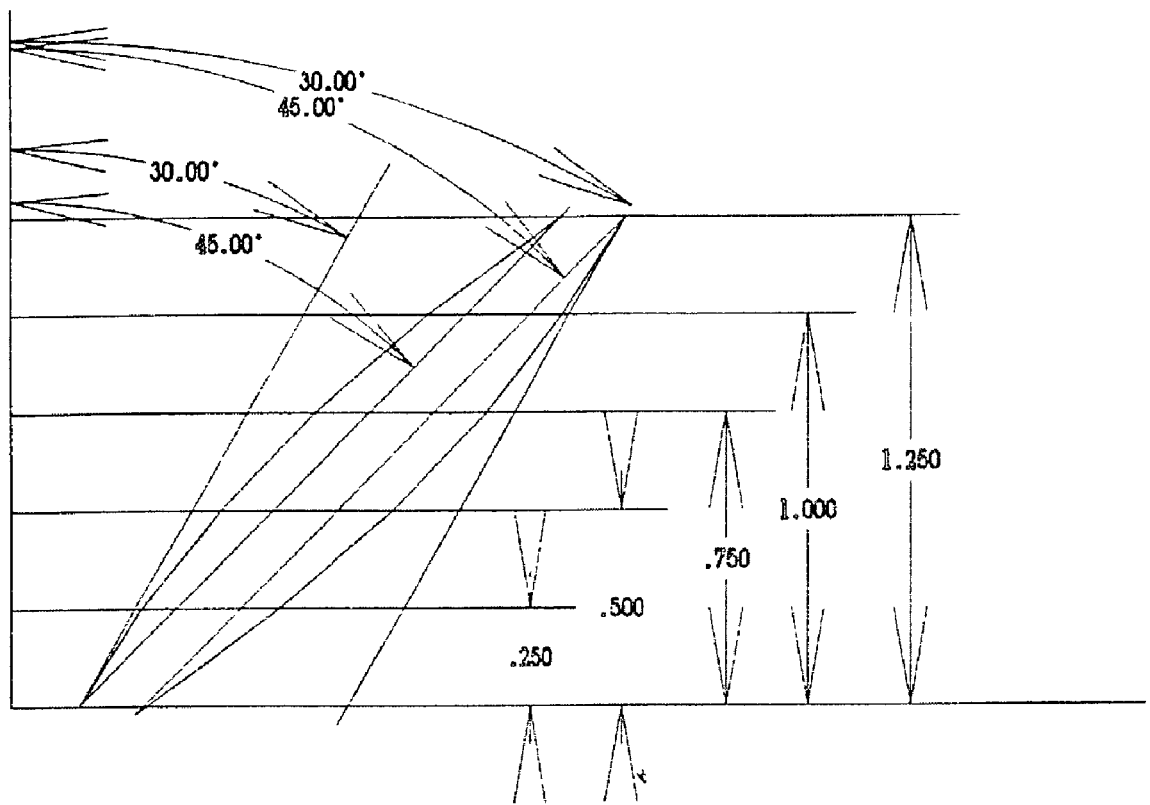
FIG. 5 is a drawing that shows two helixes to illustrate a change of 30 degrees to an ending helix of 45 degrees and 45 degrees to an ending helix of 30 degrees.

Note that, according to the invention, it is not necessary that the change in helix is always from a smaller angle to a larger angle. As shown in FIG. 4, the helix starts at 45 degrees, but ends at an angle of 30 degrees. Nor is the invention limited in terms of multiple helixes beginning and/or end at smaller or larger angles. In FIG. 5, for example, two helixes are present according to the invention, with one varying from 30 degrees to 45 degrees whereas, the other helix varies in the opposite direction, that is, from 45 degrees, ending at 30 degrees.

Figure 6:
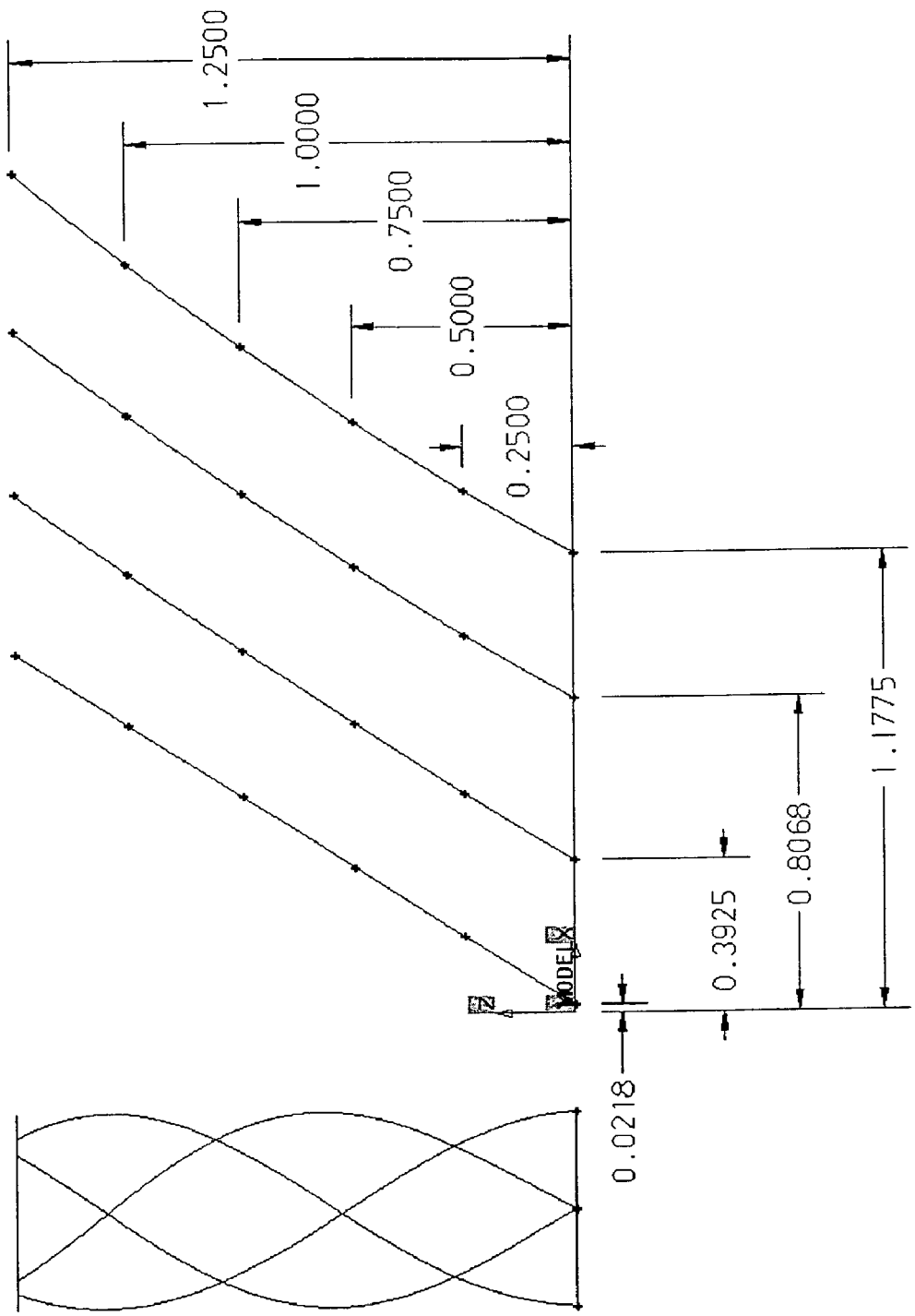
FIG. 6 is another view of the drawing of FIG. 1 with the helix wrapped around a cylinder.
Figure 7:
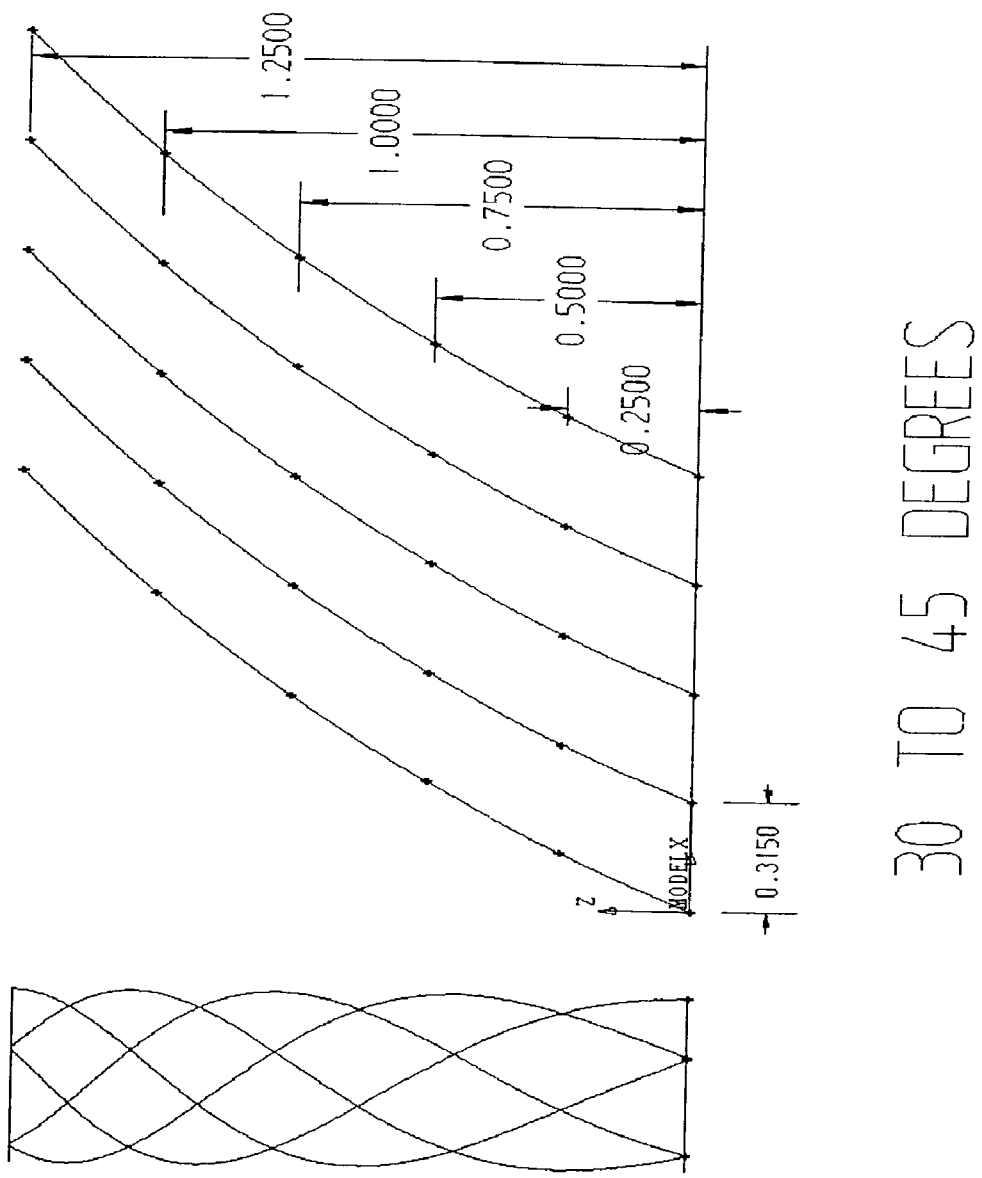
FIG. 7 shows the single-flute design of FIG. 2, a combination of multi-flutes, for a total of 5 flutes with the helix wrapped around a cylinder to show another view of a change in helix from the front or end of the tool to the shank or top of the tool.

FIG. 6 is a drawing which illustrates the example of FIG. 1, now wrapped around a cylinder to provide a different view. FIG. 7 is a drawing of the configuration of FIG. 2, but in this case including a combination of multiple flutes, for a total of five flutes wrapped around a cylinder to provide a different view, showing the change in helix from the front or end of the tool to the shank or top.

Figure 8:
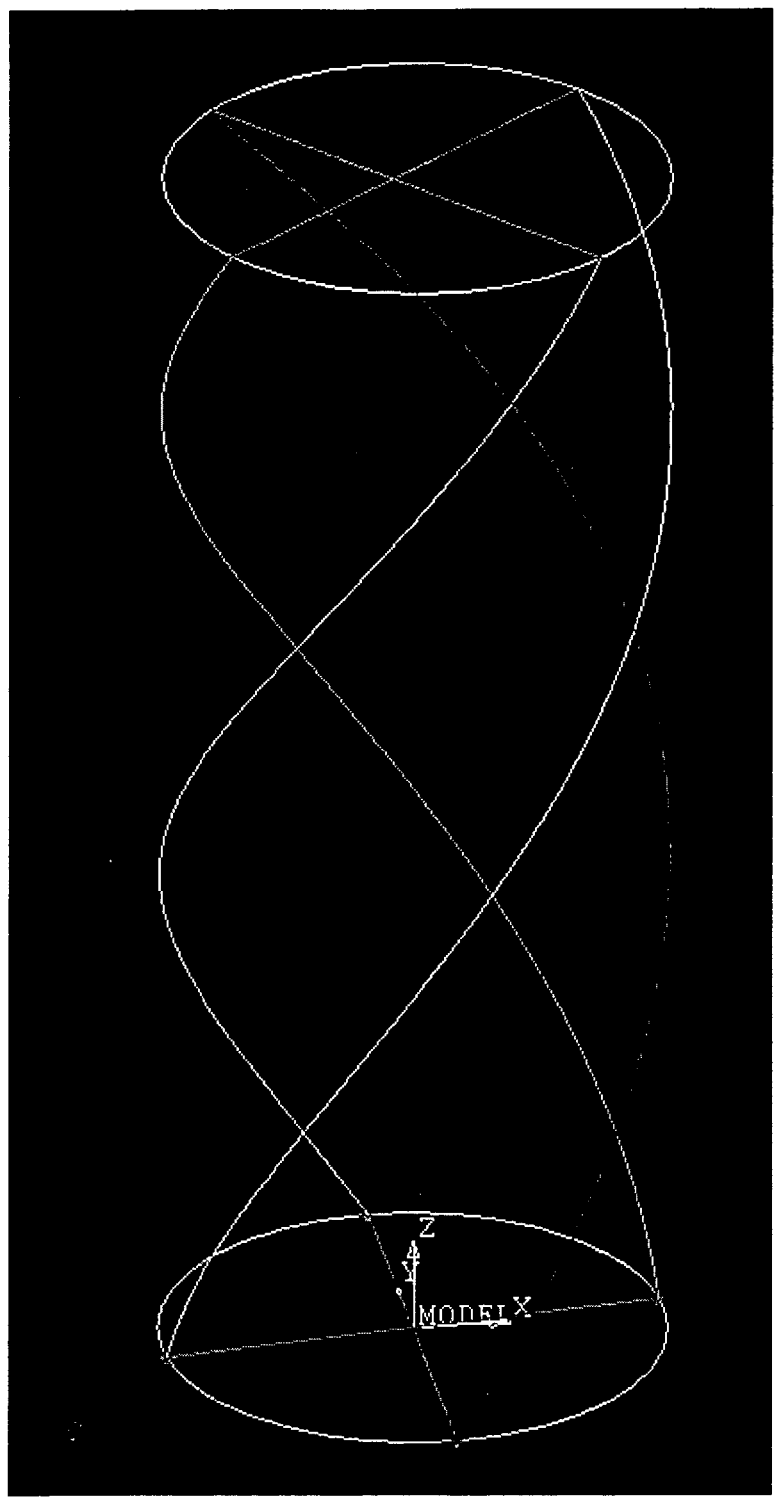
FIG. 8 shows the 4 flute tool of FIG. 1 in a 3D wire form.
Figure 9:
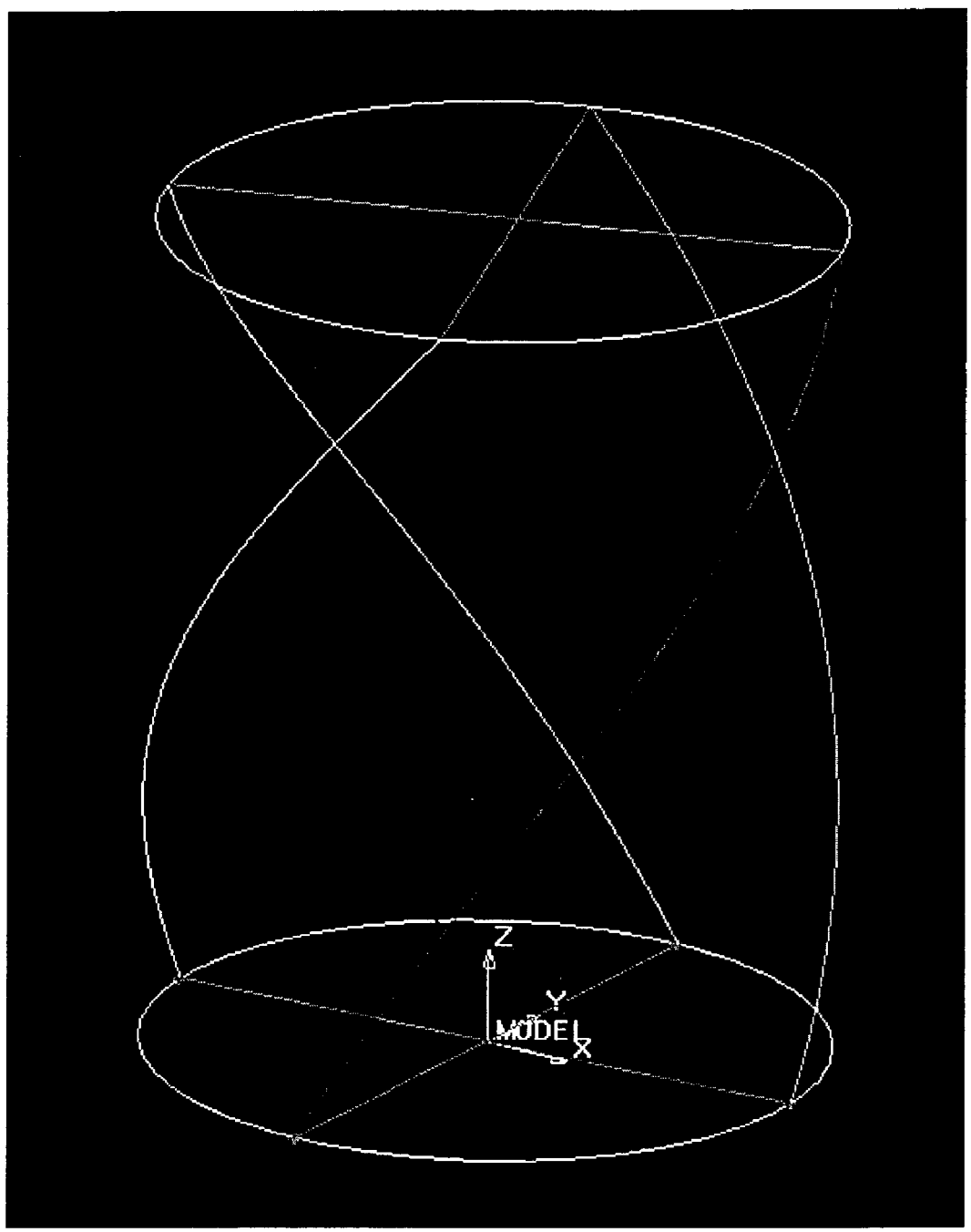
FIG. 9 shows a 4 flute tool in a 3D wire form but with a shorter length of cut.

FIG. 8 is a drawing which shows a four flute tool of the type introduced with respect to FIG. 1, presented as a three-dimensional wire form having a diameter of 0.500 and a length of 1.250. FIG. 9 is similar to the model of FIG. 8, but with a shorter length of cut, namely, 0.625.

Figure 10:
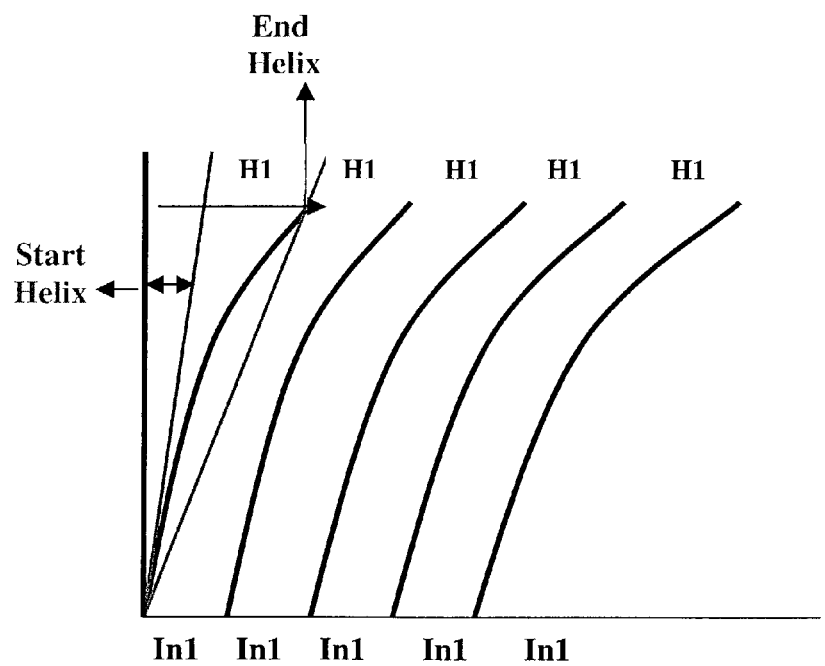
FIG. 10 illustrates a starting helix and ending helix which are equal to all flutes (H1), index from flute-to-flute is equal (In1)
Figure 11:
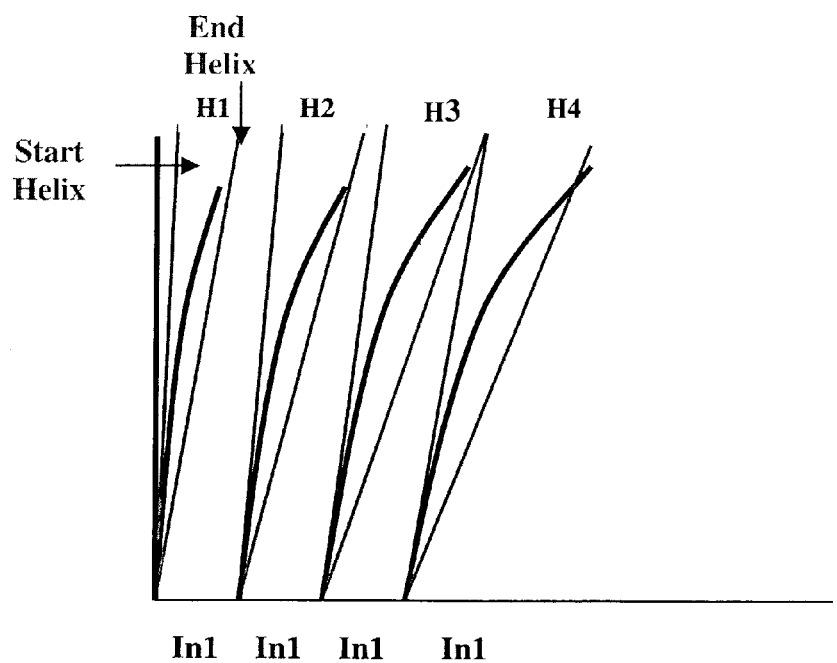
FIG. 11 illustrates a starting helix and ending helix which are not equal to any other flute (H1, H2, H3, H4), index from flute-to-flute is equal.

FIG. 10 is a diagram which shows a five-flute tool wherein the helix variability (H1) is the same from flute to flute, and wherein the indexing (In1) is also the same. FIG. 11 is a drawing which represents a four-flute tool wherein the helix variability (H1,H2,H3,H4) changes from flute to flute, but with the indexing remaining equal.

Figure 12:
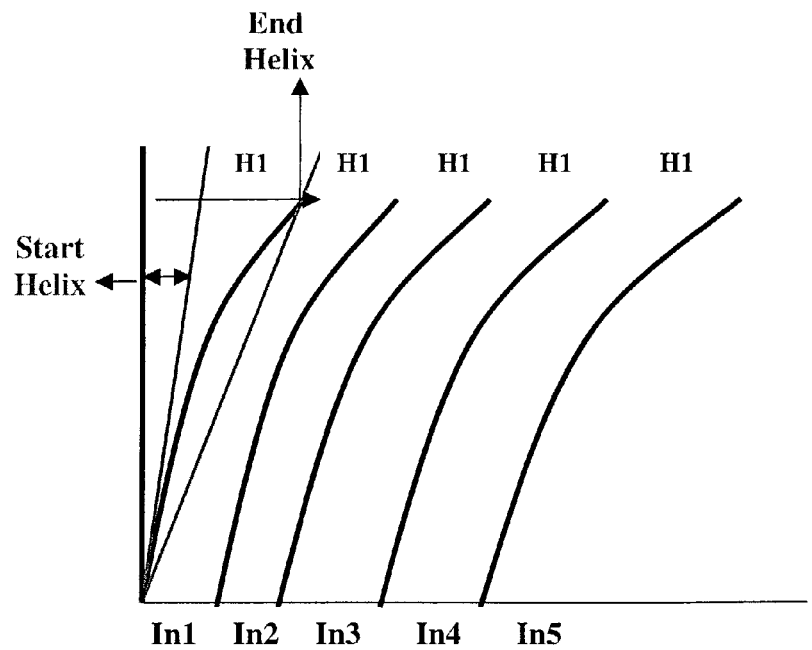
FIG. 12 illustrates a starting helix and ending helix which are equal to all flutes (H1), index from flute-to-flute is NOT equal (In1, In2, In3, In4, In5)
Figure 13:
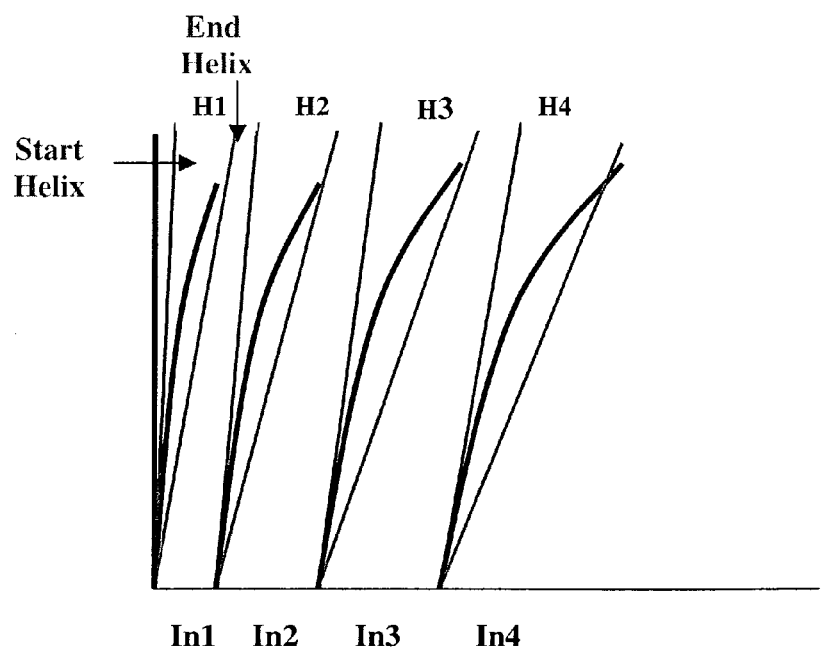
FIG. 13 illustrates a starting helix and ending helix which are not equal to any other flute (H1, H2, H3, H4), index from flute-to-flute is NOT equal (In1, In2, In3 In4)

FIG. 12 is a drawing which illustrates a five-flute tool, wherein the helix variability (H1) remains the same from flute to flute, wherein the indexing changes from In1 to In5. FIG. 13 is a drawing which shows a four-flute tool wherein the helix variability changes from H1 to H4, and wherein the indexing also changes from In1 to In4.

Figure 14:
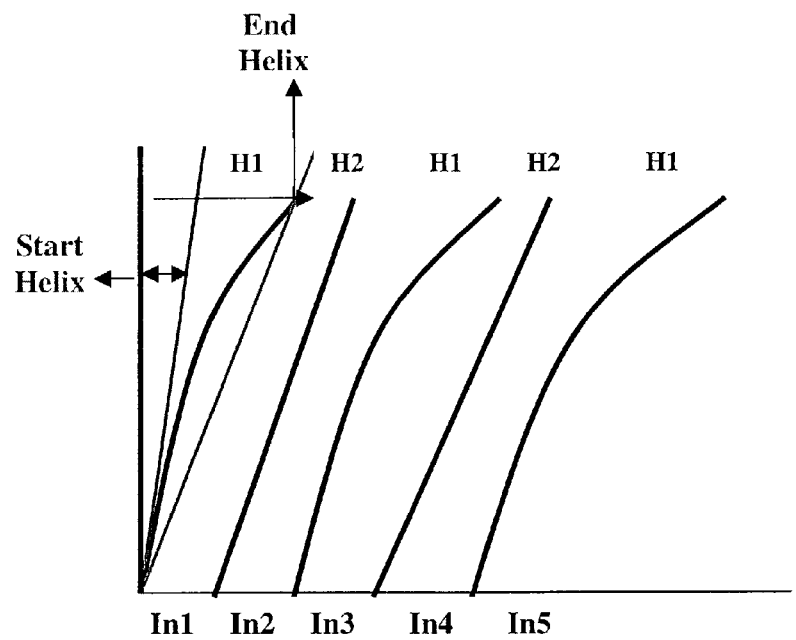
FIG. 14 illustrates a starting helix and ending helix which are equal to all flutes (H1), H2 is not a changing helix, index from flute-to-flute is NOT equal (In1, In2, In3, In4, In5)
Figure 15:
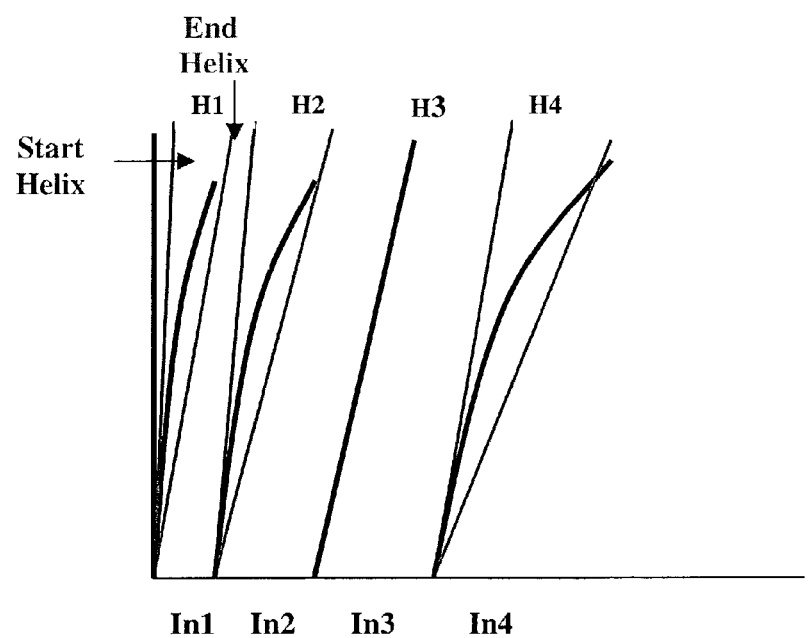
FIG. 15 illustrates a starting helix and ending helix which are not equal to any other flute (H1, H2, H4) helix H3 is not a changing Helix), index from flute-to-flute is NOT equal (In1, In2, In3, In4)

FIG. 14 is a drawing of a different alternative embodiment of the invention, representative of a five-flute tool, wherein, not only does helix variability and indexing change from flute to flute, but whereas the change from start to finish angles is the same for flutes 1, 3 and 5, the helixes of flutes 2 and 4 do not change, representing a combination of variable and standard helix geometries in the same too. In FIG. 15, flutes 1, 2 and 4 are variable, changing from start to finish, whereas flute 3 does not change from end to end. Again, however, this represents a combination of variable and standard helix configurations.

Figure 16:
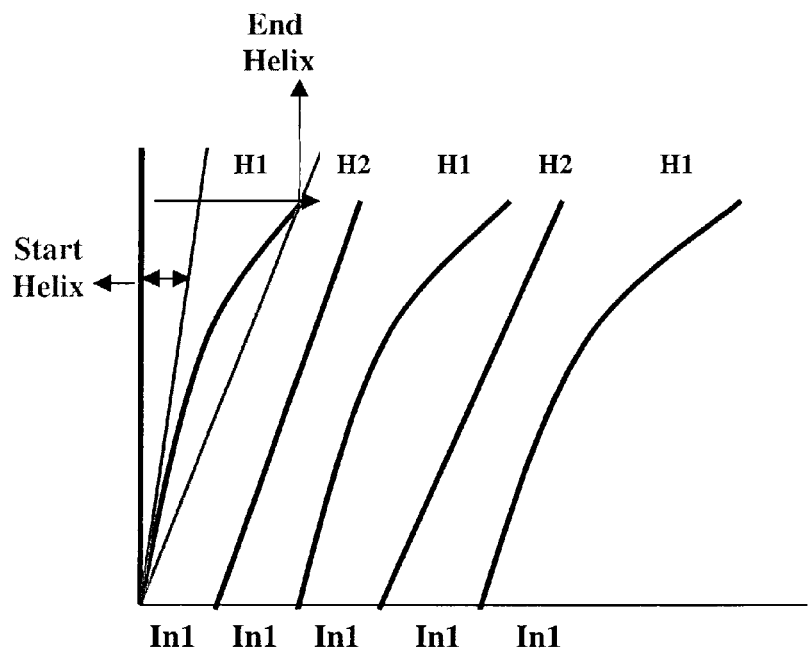
FIG. 16 illustrates a starting helix and ending helix which are equal to all flutes (H1), H2 is not a changing helix, index from flute-to-flute are equal (In1)
Figure 17:
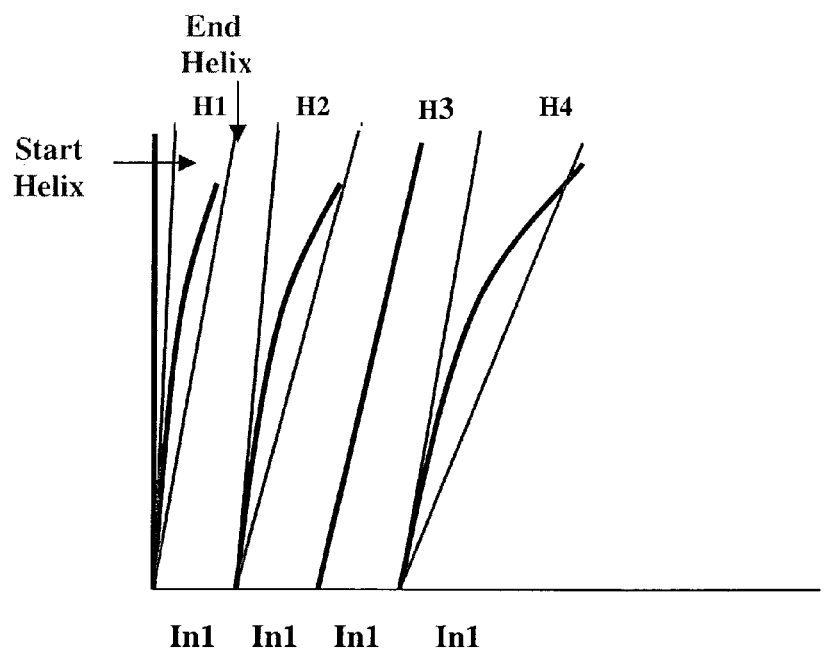
FIG. 17 illustrates a starting helix and ending helix which are not equal to any other flute (H1, H2, H4) helix H3 is not a changing Helix), Index from flute-to-flute are equal (In1)
Figure 18:
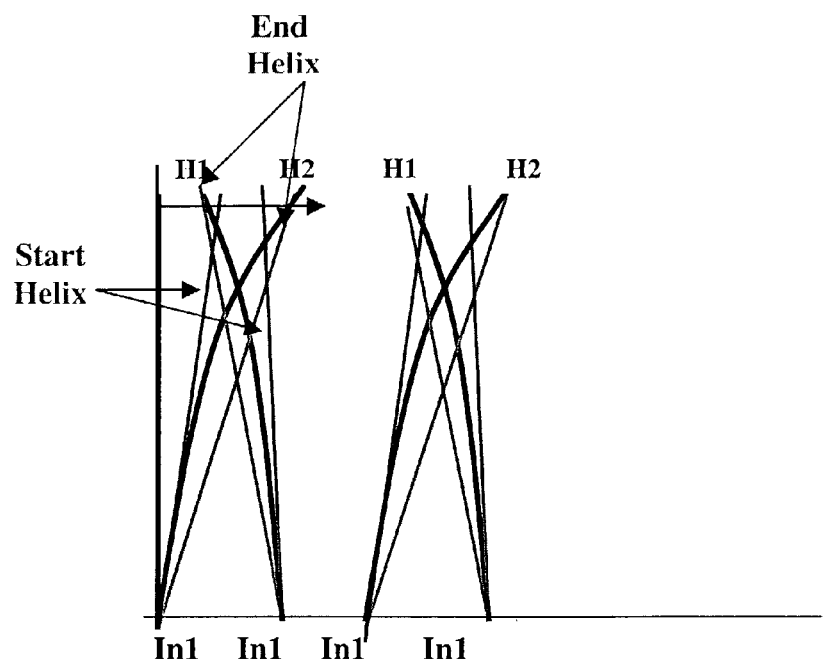
FIG. 18 illustrates two starting helix and ending helix which are equal (H1), two (H2), the index from flute-to-flute are equal (In1)
Figure 19:
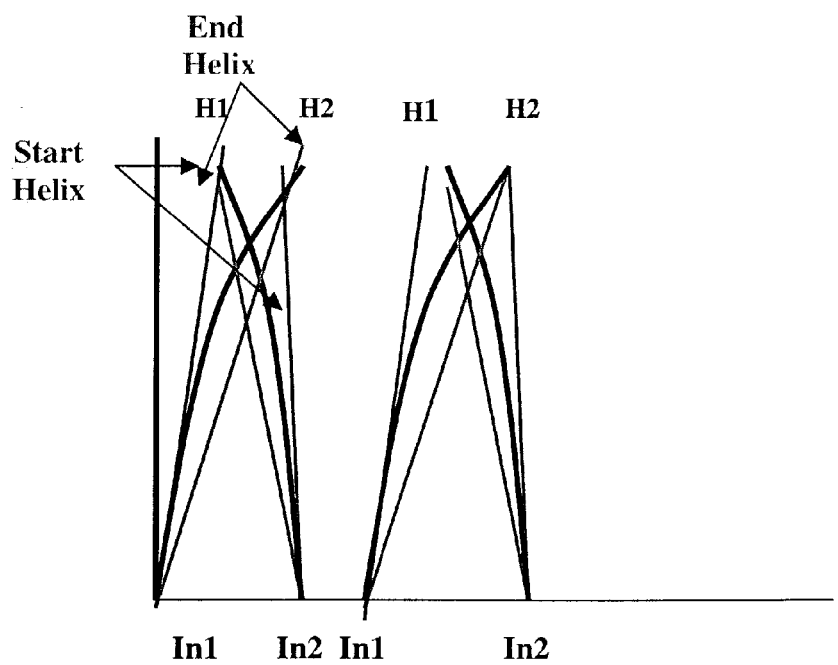
FIG. 19 illustrates two starting helix and ending helix which are equal to (h1), two (H2), the index from flute-to-flute are not equal (In1, In2)

In FIG. 16, while the indexing remains the same from flute to flute, flutes 1, 3 and 5 are variable, whereas flutes 2 and 4 are not. In FIG. 17, the indexing remains the same, with flutes 1, 2 and 4 incorporating different helix variabilities, with helix H3 being standard. The invention is not limited in terms of right- versus left-hand helix progressions. FIG. 18, for example, illustrates four flutes, all being variable, but whereas flutes 1 and 3 are right-hand cut, flutes 2 and 4 are left-hand cut helixes. This represents a combination of variable helix in conjunction with right- and left-hand orientations. Although in this case, the indexing from flute to flute is equal, the indexing in accordance with such geometries may also change, as shown in FIG. 19.

Figure 20:
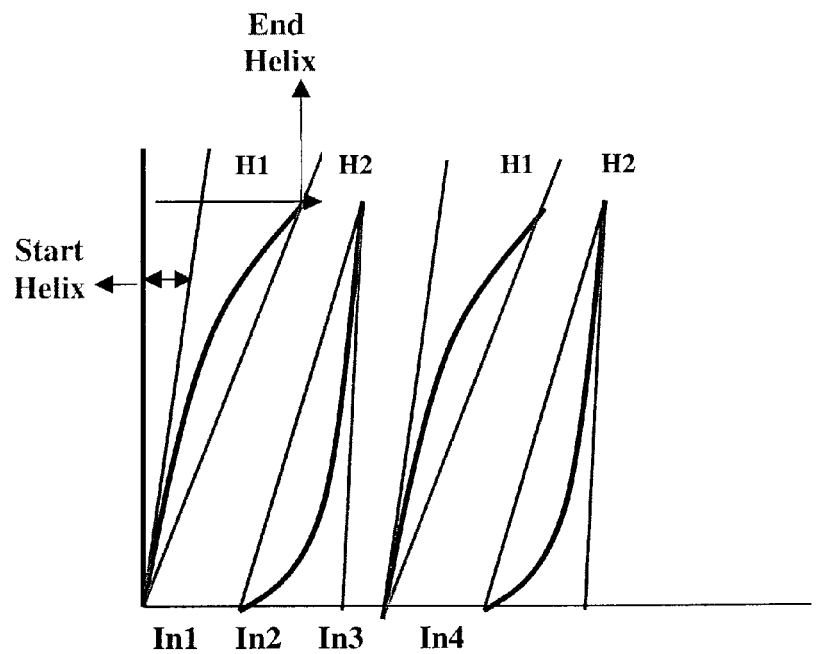
FIG. 20 illustrates a starting helix and ending helix which are equal to all flutes (H1), the index from flute-to-flute is not equal (In1, In2, In3, In4, In5)
Figure 21:
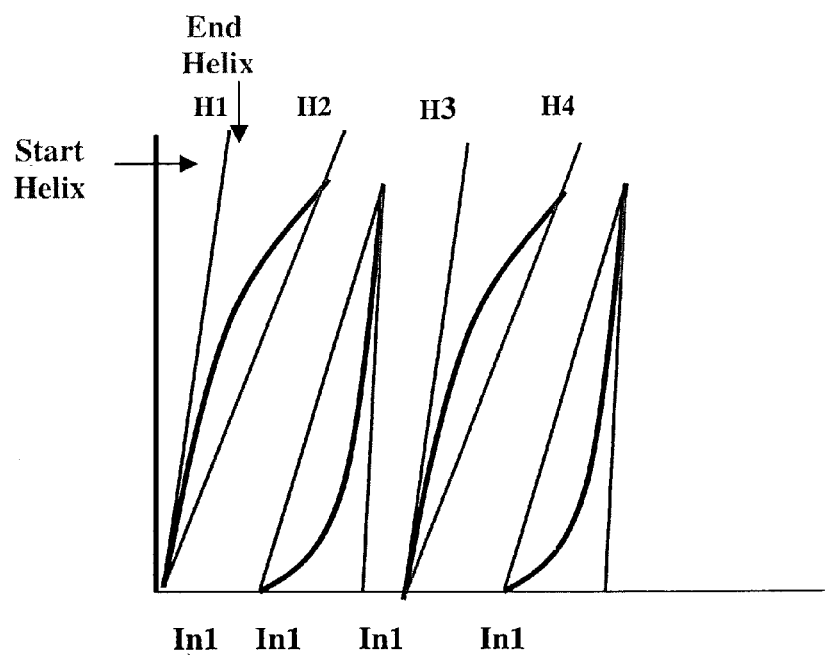
FIG. 21 illustrates a starting helix and ending helix which are equal to all flutes (H1), index from flute-to-flute are equal (In1)

Larger to smaller and smaller to larger helix variabilities may also be combined in multiple flutes on the same tool. As shown in FIG. 20, the variable helixes are different from flute to flute, with flutes 1 and 3 having the same variable helix from smaller to larger, and flutes 2 and 4 having the same variability, but from a larger degree to a smaller degree. In this case, the indexing from flute to flute is not the same, whereas, in FIG. 21, the indexing is equal.

Figure 22:
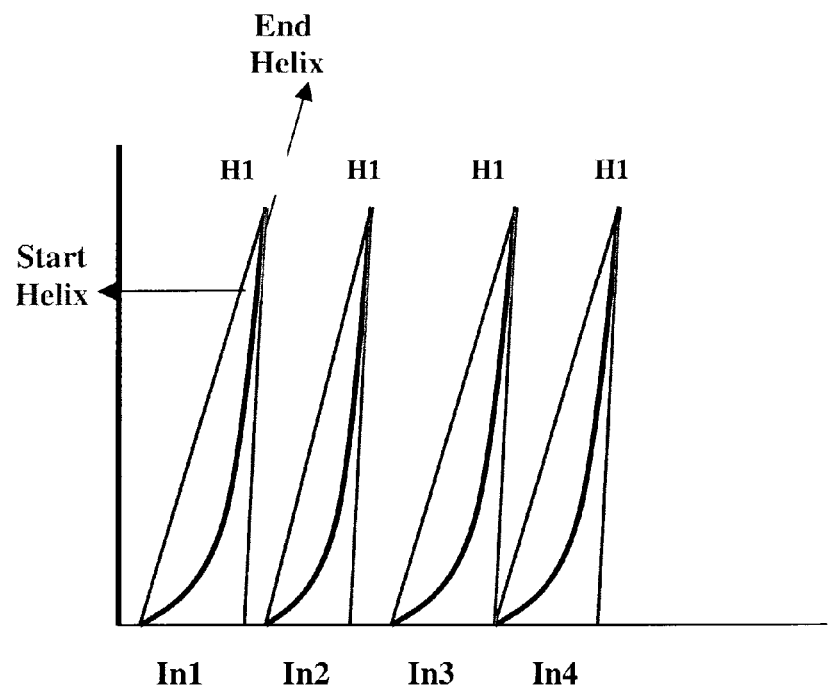
FIG. 22 illustrates a starting helix and ending helix which are equal to all flutes (H1), index from flute-to-flute is NOT equal (In1, In2, In3, In4, In5)
Figure 23:
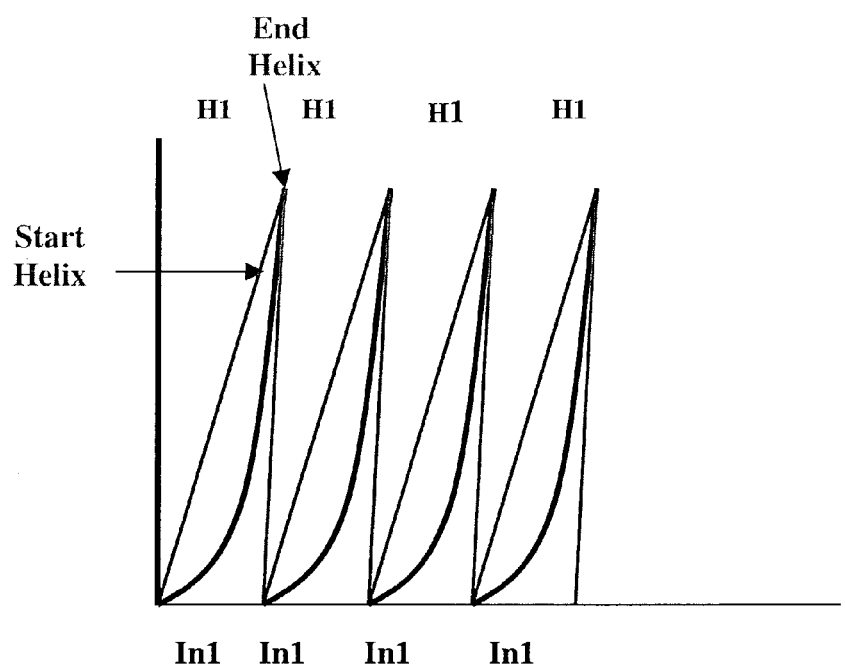
FIG. 23 illustrates a starting helix and ending helix which are equal to all flutes (H1), index from flute-to-flute are equal (In1).

FIG. 22 illustrates yet a further alternative embodiment of the invention, wherein the variability of each helix is the same from flute to flute, but varies from a larger degree helix to a smaller degree helix with the indexing changing from In1 to In4. In FIG. 23, however, the indexing remains the same (In1).

We claim:

1. A cutting tool having a shank with a body portion extending from an end to an inception location, comprising:
   a helical flute within the body portion, including three or more flutes indexed from one another, and wherein:
   one of the flutes has a cutting edge with an angle that varies along its length—and another one of the flutes has a cutting edge with an angle that remains constant along its length; and
   the flutes have cutting edges with angles that remain constant along their length, but wherein the indexing among the flutes is different.

2. A cutting tool having a shank with a body portion extending from an end to an inception location, comprising:
   a helical flute within the body portion, including three or more flutes indexed from one another, and wherein:
   one of the flutes has a cutting edge with an angle that varies along its length—and another one of the flutes has a cutting edge with an angle that remains constants along its length; and
   the flutes have cutting edges with different angles and the indexing among the flutes is the same.

* * * * *